June 30, 1970 H. BLAZEK 3,517,559
PNEUMATIC ACCELEROMETER
Filed Dec. 22, 1966
FIG. 1.
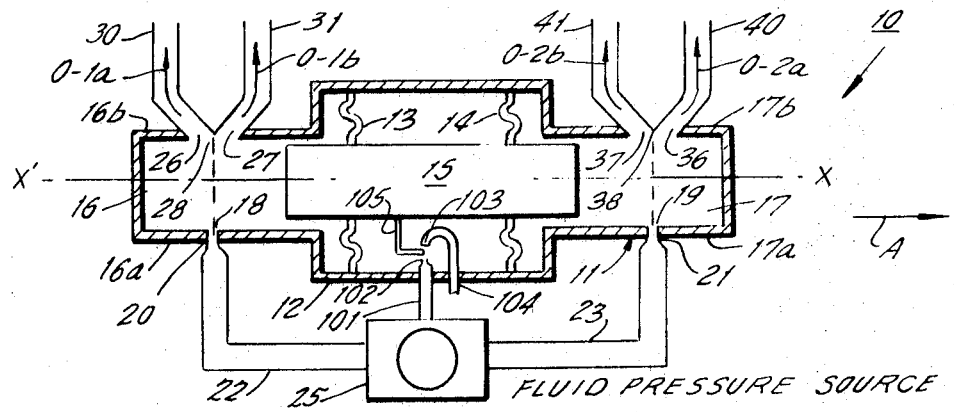
FIG. 3.
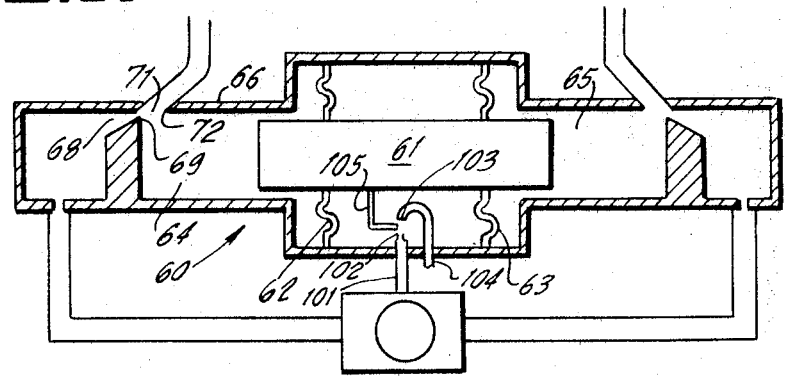
FIG. 2.
FIG. 4.
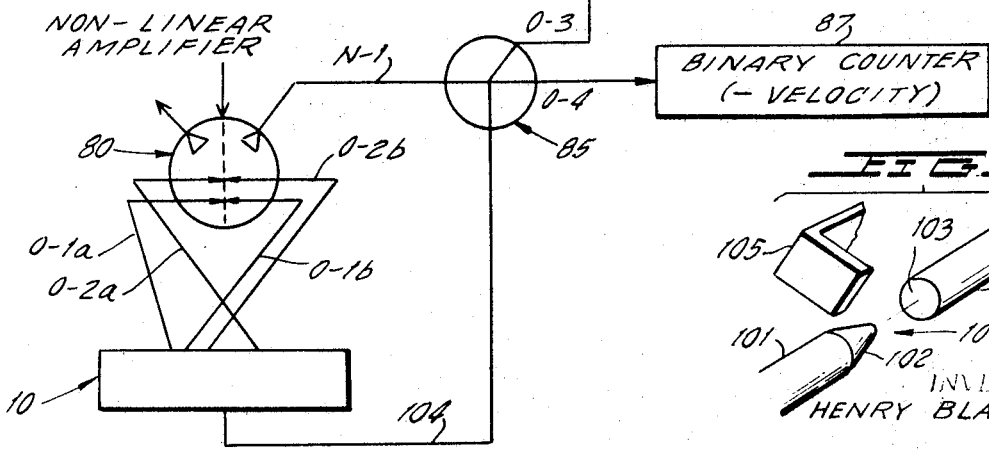
INVENTOR
HENRY BLAZEK
BY

United States Patent Office 3,517,559
Patented June 30, 1970

3,517,559
PNEUMATIC ACCELEROMETER
Henry Blazek, Nyack, N.Y., assignor to Sperry Rand Corporation, Ford Instrument Company Division, Long Island City, N.Y., a corporation of Delaware
Filed Dec. 22, 1966, Ser. No. 604,013
Int. Cl. G01p 7/00
U.S. Cl. 73—503
10 Claims

ABSTRACT OF THE DISCLOSURE

A non-rotating seismic mass is mounted to vary the volume of a resonant cavity and in so doing vary the frequency of a fluid output signal in accordance with applied acceleration. A fluid jet directed across the cavity impinges upon a knife edge to generate noise throughout a frequency spectrum including the resonant frequency range of the cavity for all positions of the seismic mass.

---

The instant invention relates to measuring instruments in general and more particularly to an instrument which senses acceleration and provides an output in fluid form without converting from another form of energy.

For many applications where adverse environmental conditions, such as extreme temperatures, shock and/or vibrations, are likely to be encountered fluid control systems have been found to be advantageous over equivalent electro-mechanical systems. However, in order to take full advantage of the potentials of fluid control systems it is necessary to provide sensing devices which are fluid operated so that the fluid control system is driven directly by a fluid sensor without the necessity of converting from another form of energy. Prior art accelerometers provide either electrical or mechanical outputs which must be converted into fluid form in order to be used in a fluid control system.

Briefly, the device of the instant invention, as hereinafter explained in detail, utilizes a seismic mass to vary the volume, hence the frequency, of a resonant cavity. Oscillations are established in the cavity by directing a high speed fluid jet at a knife edge in the cavity with the natural instability of the jet at the knife edge generating noise in the cavity. When the noise spectrum overlaps the natural resonant frequency of the cavity, an output signal related to cavity size, is generated. The seismic mass also extends into another resonant cavity with the mass being mounted in such a manner that movement of the mass to increase the volume of one of the cavities correspondingly decreases the volume in the other cavity. Thus, the resonant frequency of one cavity increases while the resonant frequency of the other cavity decreases. The difference in resonant frequencies is proportional to the acceleration to which the seismic mass is subjected.

Since the integral of any periodic function is proportional to the number of cycles over the period of integration, the device of the instant invention may be utilized to measure velocity increments. Thus, by utilizing pneumatic pulse counters to count each cycle and by taking the difference in the total counts registered by each of the counters the velocity increment is obtained.

Accordingly, a primary object of the instant invention is to provide a novel device which produces a fluid output functionally related to acceleration without converting from some other form of energy.

Another object is to provide a novel fluid device for sensing acceleration.

Still another object is to provide a novel fluid control system with fluid sensors for determining velocity increments.

These as well as other objects of the instant invention will become readily apparent after reading the following description of the accompanying drawings in which:

FIG. 1 is a longitudinal cross-section in schematic form of a fluid operated acceleration sensing device constructed in accordance with teachings of the instant invention.

FIG. 2 is a schematic illustrating the acceleration sensor of FIG. 1 as part of a fluid control system for determining incremental velocity.

FIG. 3 is a longitudinal cross-section in schematic form illustrating another embodiment of a fluid operated acceleration sensor.

FIG. 4 is a fragmentary perspective illustrating the sign indicator portion of FIG. 1.

Now referring to the figures and more particularly to FIG. 1. Pneumatic acceleration sensor or fluid accelerometer 10 includes a frame portion comprised of hollow elongated body 11 whose longitudinal axis $x'-x$ coincides with the measuring axis of accelerometer 10. The central portion 12 of body 11 bulges outwardly to provide a space for bellows type springs 13, 14 each having a central opening through which seismic mass 15 extends. Seismic mass 15 is an elongated member of a square cross-section. Springs 13, 14 are spaced along measuring axis $x'-x$ with the peripheries of springs 13, 14 being fixedly secured to the interior of body portion 12 while the edges of springs 13, 15 defining their respective openings are fixedly secured to the exterior of seismic mass 15 at locations equally spaced from the midpoint between the ends of mass 15. The narrow portions 16, 17 of body 11 positioned at opposite ends of wide portion 12 constitute resonant cavities, each of the same length and the same square cross-sectional shape and dimensions.

Springs 13, 14 are very stiff in radial directions and position seismic mass 15 with its longitudinal axis coinciding with measuring axis $x'-x$. Under conditions of zero acceleration opposite ends of seismic mass 15 extend equally into cavities 16, 17 and under such conditions the volumes of these cavities 16, 17 are equal. Ports 18, 19 in side walls 16a, 17a of cavities 16, 17, respectively, are connected to the exit ends of nozzles 20, 21, respectively. Conduits 22, 23 connect the entrance ends of nozzles 20, 21 respectively, to fluid pressure source 25.

For a reason to be hereinafter explained, accelerometer 10 is provided with the sign indicator means 100 illustrated most clearly in FIG. 4 to indicate the direction of acceleration forces acting on accelerometer 10. Sign indicator means 100 includes input tube 101 connected at one of its ends to fluid pressure source 25. At the other end of tube 101 is tapered nozzle 102 which normally directs a stream of fluid toward the entrance end 103 of collector tube 104. L-shaped deflector projection 105, mounted to seismic mass 15 and movable therewith, is positioned so as to interfere with fluid flow from nozzle 102 into collector tube 104 whenever accelerometer 10 is subjected to accelerations in a direction opposite to that indicated by arrow A. With seismic mass 15 in its neutral position of FIG. 1 and/or when moved to the left thereof, projection 105 does not interfere with fluid flow from nozzle 102 into collector tube 104.

Cavity wall 16b opposite wall 16a is provided with exit ports 26, 27 separated by a partition terminating in knife edge 28 while cavity wall 17b is provided with exit ports 36, 37 separated by a partition terminating in knife edge 38. For a reason to be hereinafter explained, conduits 30, 31, 40, 41 connect exit ports 26, 27, 36, 37, respectively, to non-linear pneumatic amplifier 45 (FIG. 2).

Nozzle 20 is positioned to direct a fluid jet across cavity 16 against knife edge 28 while nozzle 21 directs another fluid jet across cavity 17 against knife edge 38. Operation of accelerometer 10 is dependent upon the natural instability of a fluid jet when it is symmetrically disposed to stride a knife edge. Under such conditions small vortices formed at the knife edge tend to make the division of flow on either side of the knife edge unstable. This fluid instability generates a so-called noise spectrum having a frequency range determined by the geometry of the knife edge and the flow parameters of the jet. By adjusting these parameters so that the noise spectrum is in the region of the natural frequency of the resonant cavity across which the jet flows, fluid flow may be made to oscillate at the resonant frequency of the cavity. The lowest frequency at which oscillation can be made to occur is equal to the reciprocal of the time it tages for a pressure wave to travel twice the length of the cavity. Hence:

$$f = c/2L$$

where:

$f$ = frequency of oscillation
$c$ = velocity of sound in cavity
$L$ = length of cavity.

In each of the cavities 16, 17 jet flow across the cavity divides at the knife edge. It appears that the resonant oscillations resulting from impingement of the fluid jet upon the knife edge cause the jet to be deflected alternately on either side of the knife edge, thereby causing fluid output flow through the exit ports of each cavity to vary periodically 180° out of phase. In particular, outputs O–1a and O–1b flow in conduits 30, 31, respectively, while outputs O–2a, O–2b flow in conduits 40, 41, respectively.

Seismic mass 15 is mounted in such a manner that when accelerometer 10 is subjected to accelerations along measuring axis $x'-x$, the volume in one of the resonant cavities 16, 17 increases while the volume of the other cavity decreases correspondingly thereby changing the respective resonant frequencies of cavities 16, 17. This results in the generation of a differential frequency proportional to acceleration. Springs 13, 14 provide a restoring force which acts on seismic mass 15 in proportion to displacement of mass 15 from its neutral position (shown in FIG. 1) along measuring axis $x'-x$.

If accelerometer 10 is subjected to an acceleration in the direction indicated by arrow A, then seismic mass 15 will be relatively displaced in the opposite direction to accelerometer body 11. Hence, the resonant frequency of cavity 16 will increase and the resonant frequency of cavity 17 will decrease in accordance with changes in cavity length. It is readily shown that the difference frequency is:

$$f_1 - f_2 = \frac{\frac{cm}{L^2K}A_x}{1 - \frac{mA_x^2}{KL}}$$

where:

$K$ = a constant equal to the axial spring gradient
$A_x$ = acceleration along $x'-x$ axis
$m$ = mass of the seismic mass
$f$ = frequency of oscillation
$c$ = velocity of sound in cavity
$L$ = length of cavity By making $mA_x/KL$ small, its square may be made negligible and the difference frequency may be made to be a linear function of acceleration. Under these conditions:

$$f_1 - f_2 \frac{cm}{L^2K} A_x$$

In some applications it is necessary to measure velocity increment, or the integral of acceleration. The manner in which this may be accomplished may be seen by integrating the previous equation. This yields:

$$\int_{t_1}^{t_2} f_1 - f_2 dY = \frac{cm}{L^2K} \int_{t_1}^{t_2} A_x dY$$

Since the integral of any periodic function is proportional to the number of cycles over the period of integration, it is evident that the difference in the total number of cycles between resonant cavities 16, 17 will be proportional to the velocity increment.

Now referring more particularly to FIG. 2 which shows outputs O–1a, O–1b, O–2a, O–2b fed to the inputs of non-linear amplifier 80 which is of a type illustrated in U.S. Pat. 3,240,221 issued Mar. 15, 1966, to C. H. T. Pan for Fluid Amplifiers. Although the device described in the aforesaid Pat. 3,240,221 is referred to as a linear amplifier, the linearity claimed is only approximate and is achieved only over a very limited range by careful adjustment of parameters. Inherently such fluid amplifiers are non-linear devices so that by varying either the geometry or the fluid parameters from those necessary to yield linear operation inherent non-linear qualities are accentuated.

The outputs of accelerometer 10 are sinusoidal. It is well known that when sinusoids are added or mixed in a non-linear amplifier, the output contains the input frequencies plus sum and difference frequencies of the input. Hence, if the frequency of each oscillator section of accelerometer 10 was 5 kc. and varies plus or minus 5%, and if amplifier response was flat, amplifier output would contain frequency components of 0–500 c.p.s., 5 kc. and 10 kc. However, since all fluid amplifiers have an upper frequency limit beyond which response begins to fall off rapidly, such amplifiers discriminate against high frequencies. A relatively low high frequency cutoff is readily obtained in fluid amplifier constructions. By making the high frequency cutoff significantly less than 5 kc., for example 1 kc., amplifier output will contain only the difference frequencies.

For non-linear amplifier 80 of FIG. 2 the high frequency cutoff is such that amplifier output N–1 contains primarily the difference frequency between the two oscillator sections of accelerometer 10. Since the difference frequency permits a determination of input acceleration magnitude only, it is necessary to make a separate determination of acceleration direction.

The latter is accomplished by the sign indicator means 100 which functions in the manner described in detail in the article by R. N. Auger entitled "How to Use Turbulance Amplifiers for Control Logic" which appeared in the June 1964 edition of Control Engineering beginning on page 39 thereof. Briefly, considering acceleration in the direction of arrow A to be positive, such an acceleration causes seismic mass 15 to move to the left with respect to body 11 to move projection 105 away from the fluid stream issuing from nozzle 102 and directed toward collector tube 104. With negative acceleration (direction opposite to arrow A) projection 105 moves into the fluid stream issuing from nozzle 102 preventing fluid flow into collector tube 104. Hence, flow in collector tube 104 indicates positive acceleration and the absence of flow in tube 104 indicates negative acceleration.

The output of collector tube 104 is applied to the switching input of inverter 85 of a construction similar to that shown in FIG. 3 of U.S. Pat. 3,243,113 issued Mar. 29, 1966, to H. F. Welsh for a Fluid Binary Counter. If positive acceleration exists then there is fluid flow through collector tube 104 causing the input signal N–1 to inverter 85 to be deflected to inverter output O–4 to inverter output O–3. If negative acceleration exists then there is no flow in collector tube 104 and the output N–1 of non-linear amplifier 80 appears at inverter output O–4. Outputs O–3, O–4 are fed to binary counters 86, 87 respectively, which indicate positive and negative velocities, respectively. The net velocity is the algebraic sum of the readings obtained from both counters 86 and 87.

Pneumatic accelerometer 60 illustrated in FIG. 3 is a modification of accelerometer 10, with both accelerometers 10 and 60 operating on a principle utilizing a seismic mass to simultaneously vary the resonant frequencies of a pair of cavities and in so doing vary fluid flow at output ports of these cavities, these output ports each having a knife edge at the entrance thereto in the path of a fluid jet stream introduced through a cavity entrance port.

More particularly, accelerometer 60 includes elongated seismic mass 61 mounted by bellows type springs 62, 63 in essentially the same manner as corresponding elements of accelerometer 10. Opposite ends of seismic mass 61 extend into resonant cavities 64, 65 at opposite ends of accelerometer housing 66. Since the constructions of cavities 64, 65 are identical, for the sake of brevity without sacrificing clarity, only the construction of cavity 64 will be described in detail.

The end of cavity 64 remote from seismic mass 61 is provided with a tapered formation defining nozzle 68 whose exit 69 constitutes the entrance port for cavity 64. Nozzle 68 is positioned to direct a fluid jet stream in a direction generally parallel to the accelerometer measuring axis. Entrance port 69 is in an end wall of cavity 64 and is positioned in close proximity to exit port 71 in a side wall of cavity 64. The entrance to exit port 71 is partially defined by knife edge formations 72 so positioned that the fluid jet issuing from nozzle 68 infringes upon knife edge 72.

As in accelerometer 10, the impingement of the fluid jet stream upon knife edge 72 causes conditions of turbulence and instability in jet flow. Oscillations in accordance with resonant frequency of cavity 64 act upon the jet stream exiting at port 71 so that this stream is caused to oscillate at a frequency equal to the resonant frequency of cavity 64.

In the manner previously described in connection with accelerometer 10, movement of seismic mass 61 along its measuring axis relative to housing 66, increases the length of one of the resonant cavities 64, 65 while reducing the length of the other of these cavities. Thus, the resonant frequencies of the respective cavities 64, 65 vary with one increasing and the other decreasing in frequency with the difference in frequencies being related to acceleration.

Both outputs of accelerometer 60 may be used as inputs to a non-linear amplifier of a type shown in FIG. 4 of the aforesaid U.S. Pat. 3,240,221 modified to accept two inputs instead of one.

Thus, it is seen that the instant invention provides constructions for pneumatic accelerometers as well as fluid control apparatus in which all of the fluid signal inputs to the apparatus components originate as fluid signals and do not require conversion from any other energy forms.

Although there has been described a preferred embodiment of this novel invention, many variations and modifications will now be apparent to those skilled in the art. Therefore, this invention is to be limited, not by the specific disclosure herein, but only by the appending claims.

What I claim is:

1. Sensing apparatus of the class described including an inertia mass, support means mounting said mass for movement along a measuring axis from a neutral position in response to acceleration, means urging said mass to return to said neutral position when displaced therefrom, means defining a first and a second cavity each having a resonant frequency, said mass having means associated with said cavities to vary said resonant frequencies upon movement of said mass along said measuring axis, and first means connected to said cavities for detecting variations in said resonant frequencies.

2. Apparatus set forth in claim 1 in which said first means comprises means generating a first jet stream in said first cavity and directing said first jet stream out of said first cavity through a first exit port means, said first means also comprising means generating a second jet stream in said second cavity and directing said second jet stream out of said second cavity through a second exit port means.

3. Apparatus set forth in claim 2 in which there is a first formation in said first cavity positioned in the path of said first jet stream and constructed to create turbulance in said first jet stream thereby generating noise over a frequency spectrum which includes resonant frequencies of said first cavity, a second formation in said second cavity positioned in the path of said second jet stream and constructed to create turbulance in said second jet stream thereby generating noise over a second frequency spectrum which includes resonant frequencies of said second cavity.

4. Apparatus set forth in claim 3 in which said first formation comprises a knife edge positioned at the end of said first exit port means nearer said first cavity and said second formation comprises a knife edge positioned at the end of said second exit port means nearer said second cavity.

5. Apparatus set forth in claim 3 in which said measuring axis extends through said mass from its first end to its second end, said means associated with said cavities comprising a first and a second portion of said mass positioned on said measuring axis at said first and said second ends, respectively, said first portion entered into said first cavity and said second portion entered into said second cavity whereby movement of said mass along said axis is effective to increase volume of one of said cavities while simultaneously decreasing volume of the other of said cavities.

6. Apparatus set forth in claim 5 in which said cavities are of substantially equal volume when said mass is in said neutral position.

7. Apparatus set forth in claim 2 also comprising sign indicator means including a collector tube, nozzle means normally directing fluid flow into said collector tube, and deflector means connected to said inertia mass and movable therewith, said deflector means positioned to divert fluid flow from said nozzle means away from said collector tube when said apparatus is subjected to acceleration forces acting in one direction along said measuring axis, said deflector means positioned to permit fluid flow from said nozzle into said collector tube when said apparatus is subjected to acceleration forces acting in the other direction along said measuring axis.

8. Apparatus set forth in claim 2 also comprising a non-linear fluid amplifier connected to said first and said second exit port means, an amplifier having a high frequency cutoff below the resonant frequencies to produce an output signal which contains the difference frequency between signals applied to said amplifier through said first and said second exit port means.

9. Apparatus set forth in claim 8 also comprising sign indicator means including a collector tube, nozzle means normally directing fluid flow into said collector tube, and deflector means connected to said inertia mass and movable therewith, said deflector means positioned to divert fluid flow from said nozzle means away from said collector tube when said apparatus is subjected to acceleration forces acting in one direction along said measuring axis, said deflector means positioned to permit fluid flow from said nozzle into said collector tube when said apparatus is subjected to acceleration forces acting in the other direction along said measuring axis, a fluid inverter having a signal input, a switching input, a first and a second output, means feeding said output signal to said signal input, said collector tube connected to said switching input whereby signals introduced at said signal input and normally appearing at said first output appear at said second output during periods of fluid flow in said collector tube.

10. Apparatus set forth in claim 9 further comprising a first and a second binary counter connected to said first and said second outputs, respectively, with the algebraic of readings from said counters indicating net velocity of said apparatus.

References Cited
UNITED STATES PATENTS
3,033,042  5/1962  Clement et al. _____ 73—509

JAMES J. GILL, Primary Examiner

U.S. Cl. X.R.
73—515; 137—815; 235—201